US006493710B1

United States Patent
Gollapudi et al.

(10) Patent No.: US 6,493,710 B1
(45) Date of Patent: Dec. 10, 2002

(54) METHOD AND APPARATUS FOR REDUCING COSTS ASSOCIATED WITH MANIPULATING DATA

(75) Inventors: Sreenivas Gollapudi, Fremont, CA (US); Debashish Chatterjee, Fremont, CA (US)

(73) Assignee: Oracle Corporation, Redwood Shores, CA (US)

( * ) Notice: Subject to any disclaimer, the term of this patent is extended or adjusted under 35 U.S.C. 154(b) by 0 days.

(21) Appl. No.: 09/411,061

(22) Filed: Oct. 4, 1999

(51) Int. Cl.[7] .............................. G06F 17/30; H02H 3/05
(52) U.S. Cl. ...................... 707/4; 707/2; 707/4; 707/5; 714/100; 714/48; 714/52
(58) Field of Search ..................... 707/1–7, 100–104, 707/203–206, 500, 526; 714/100, 1–21, 47–57, 701, 746–769, 758, 764, 37–42, 699–710, 786–788, 789–800

(56) References Cited

U.S. PATENT DOCUMENTS 6,223,182 B1 * 4/2001 Agarwal et al. ............. 707/102
6,289,334 B1 * 9/2001 Reiner et al. .................. 707/3

* cited by examiner

Primary Examiner—Alford W. Kindred
(74) Attorney, Agent, or Firm—Hickman Palermo Truong & Becker LLP; Carine M. Tan; Edward A. Becker (57) ABSTRACT

A method and apparatus are provided for performing an array DML operation. During the performance of the operation on a data item in the array, and if an error occurs, then error information is stored and the array operation continues by performing the operation on the next data item in the array. The error is used to create update input data for the DML operation, and the update input data can be supplied during run-time of the program.

12 Claims, 3 Drawing Sheets

METHOD AND APPARATUS FOR REDUCING COSTS ASSOCIATED WITH MANIPULATING DATA

FIELD OF THE INVENTION

This present invention relates to databases and, more specifically, to methods and apparatus for reducing costs associated with manipulating data.

BACKGROUND OF THE INVENTION

In a client-server architecture, the client (application program) relies on a server to perform some operations. In the context of database servers, the application program passes data to the server, the server stores the data, and the application program manipulates and retrieves the data by sending commands to the server.

Application programs typically interact with database servers using a query language such as the Structure Query Language (SQL). SQL is a powerful non-procedural language which serves as the industry standard for relational database management systems. Data Manipulation Language (DML) statements are SQL statements that retrieve or manipulate data in tables.

Frequently, database applications must manipulate large sets of records. For example, an application program APP1 may insert an array of data "employee_stats" to a database server, where employee_stats consists of employee information for each of one thousand employees. Statements used to manipulate a series of records are referred to herein as array DML statements. The operations performed by database servers in response to array DML statements are referred to as array DML operations.

Various approaches may be used to pass data from an application program to a server. In one approach, APP1 passes employee_stats in the form of literal data (a "literal"). A literal is a value written exactly as it is meant to be interpreted. A literal can be a number, a character, or a string. For example, in the expression, Dept_Number=5

"Dept_Number" is a variable and "5" is a literal.

An application is able to pass literal data to the server only if the literal data is built into the code of the application program. Building literal data into an application program is known as hard coding. The drawback to hard coding is that the code of the application program needs to be changed and re-compiled each time there is a change to the literal data.

In another approach to providing data to a server, an application program passes data to a server using variables. For example, assume that APP1 uses an array "INSERT" statement to insert employee ID numbers into an array "A( )". In database systems that support the Structured Query Language (SQL), such a statement may take the following form:

INSERT INTO A (e_id)

In this statement, "e_id" is a variable of data type number. In our example, "e_id" is a unique value used in identifying each employee. The array A( ) has a size of 1000, indicating that there are 1000 employee ID numbers. In response to this statement, the database server performs an INSERT operation 1000 times (one INSERT per row of the array). Each of the 1000 operations is referred to herein as a "per-item" DML operation, because it only operates on a single item. Thus, a per-item DML operation means changing a single row of a given array.

Typically, a database server must perform a series of per-item DML statements in response to a single array DML statement. In one approach to handling array DML statements, the database server parses the INSERT statement before each per-item INSERT operation is executed in order to insert a row in array, A(1000). The database server parses the array DML statement to create an actual executable statement to perform the desired per-item operation on the data.

For example, the process of parsing involves passing the SQL statement, INSERT INTO A (e_id), from the user process to the database server (one round trip). During the parsing process, the database server, among other things, verifies that the SQL statement is syntactically and semantically valid, determines an execution plan for the statement, and allocates memory from a private region in memory ("private SQL area") to the verified SQL statement. Thus, parsing and execution is an expensive process because a roundtrip to the server is made each time a data manipulation language statement is to be parsed and executed and thus, the example above would result in 1000 roundtrips to the database server. However, the database may also allocate memory from a shared region in memory ("shared SQL area") to the verified SQL statement. The "shared SQL area" is an area in memory used for processing subsequent occurrences of the same SQL statement. The database server parses a SQL statement only if a shared SQL area for an identical SQL statement does not exist. If a shared SQL area for an identical SQL statement exists, there is no need to completely parse the identical SQL statement again.

However, even in the case when the data manipulation language statement is parsed once but executed multiple times (i.e., only one roundtrip to the server is needed), there is another drawback when a failure occurs during the execution of an array DML statement. When a failure occurs, the performance of the array data manipulation operation is automatically aborted, even though the operation is incomplete. A new DML statement has to be re-issued in order to proceed with the operation. For example, assume that a failure occurs when performing the INSERT operation for the nth row in A(1000). An example of a failure is when the attempt to insert the nth row involves inserting a key value into a column that is subject to a uniqueness constraint, and the key value to be inserted matches a key value that already exists in the constrained column. Such an insertion attempt results in a "UNIQUE KEY CONSTRAINT VIOLATION". Assume that "employee ID" is a unique value assigned to each employee and is stored in a unique key column of employee table. Thus, an attempt to insert a duplicate value in A(1000) would result in a Unique Key Constraint violation. In order to continue inserting values in the rest of the rows of A(1000), the INSERT statement must be re-issued, re-parsed and executed by the database server, resulting in at least an additional roundtrip to the database server. Thus, each failure that occurs during insertion of a row into A(1000) results in an additional roundtrip to the database server.

Based on the foregoing, there is a need for a method or mechanism for reducing the costs associated with manipulating data.

SUMMARY OF THE INVENTION

Techniques are provided for reducing the costs associated with manipulating data. According to one aspect of the invention, the techniques involve binding data by reference, performing data manipulation operation on a data item, and if an error occurs, then storing the error information and continuing the process by performing the operation on the next data item. In one feature, the error information is used to create corrective data for the data manipulation operation.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

A method and apparatus for reducing costs associated with manipulating data is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

HARDWARE OVERVIEW

Figure 1:
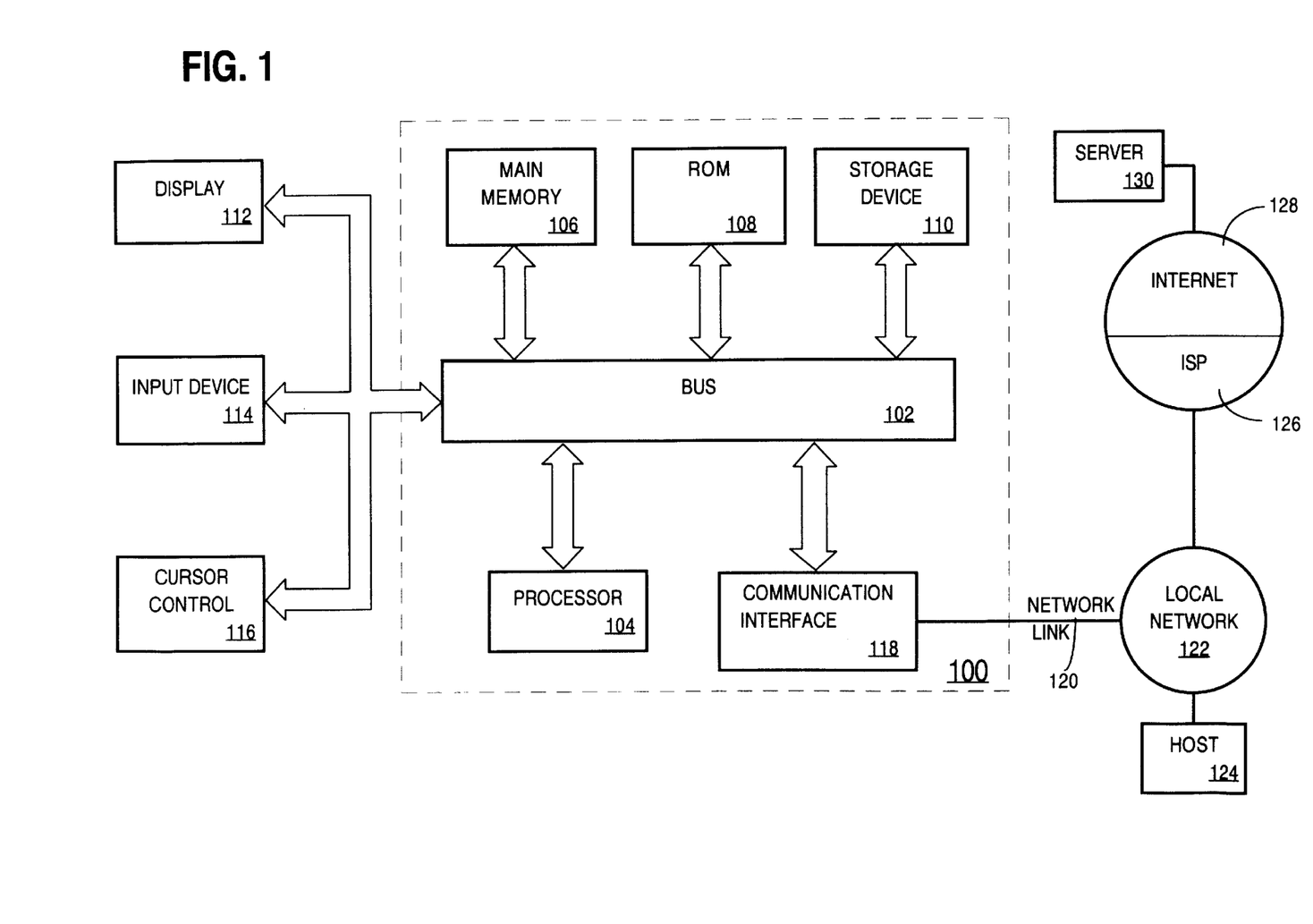
FIG. 1 is a block diagram illustrating a computer system on which embodiments of the invention may be implemented.

FIG. 1 is a block diagram that illustrates a computer system 100 upon which an embodiment of the invention may be implemented. Computer system 100 includes a bus 102 or other communication mechanism for communicating information, and a processor 104 coupled with bus 102 for processing information. Computer system 100 also includes a main memory 106, such as a random access memory (RAM) or other dynamic storage device, coupled to bus 102 for storing information and instructions to be executed by processor 104. Main memory 106 also may be used for storing temporary variables or other intermediate information during execution of instructions to be executed by processor 104. Computer system 100 further includes a read only memory (ROM) 108 or other static storage device coupled to bus 102 for storing static information and instructions for processor 104. A storage device 110, such as a magnetic disk or optical disk, is provided and coupled to bus 102 for storing information and instructions.

Computer system 100 may be coupled via bus 102 to a display 112, such as a cathode ray tube (CRT), for displaying information to a computer user. An input device 114, including alphanumeric and other keys, is coupled to bus 102 for communicating information and command selections to processor 104. Another type of user input device is cursor control 116, such as a mouse, a trackball, or cursor direction keys for communicating direction information and command selections to processor 104 and for controlling cursor movement on display 112. This input device typically has two degrees of freedom in two axes, a first axis (e.g., x) and a second axis (e.g., y), that allows the device to specify positions in a plane.

The invention is related to the use of computer system 100 for implementing the techniques described herein. According to one embodiment of the invention, those techniques are implemented by computer system 100 in response to processor 104 executing one or more sequences of one or more instructions contained in main memory 106. Such instructions may be read into main memory 106 from another computer-readable medium, such as storage device 110. Execution of the sequences of instructions contained in main memory 106 causes processor 104 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 104 for execution. Such a medium may take many forms, including but not limited to, non-volatile media, volatile media, and transmission media. Non-volatile media includes, for example, optical or magnetic disks, such as storage device 110. Volatile media includes dynamic memory, such as main memory 106. Transmission media includes coaxial cables, copper wire and fiber optics, including the wires that comprise bus 102. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 104 for execution. For example, the instructions may initially be carried on a magnetic disk of a remote computer. The remote computer can load the instructions into its dynamic memory and send the instructions over a telephone line using a modem. A modem local to computer system 100 can receive the data on the telephone line and use an infra-red transmitter to convert the data to an infra-red signal. An infra-red detector can receive the data carried in the infra-red signal and appropriate circuitry can place the data on bus 102. Bus 102 carries the data to main memory 106, from which processor 104 retrieves and executes the instructions. The instructions received by main memory 106 may optionally be stored on storage device 110 either before or after execution by processor 104.

Computer system 100 also includes a communication interface 118 coupled to bus 102. Communication interface 118 provides a two-way data communication coupling to a network link 120 that is connected to a local network 122. For example, communication interface 118 may be an integrated services digital network (ISDN) card or a modem to provide a data communication connection to a corresponding type of telephone line. As another example, communication interface 118 may be a local area network (LAN) card to provide a data communication connection to a compatible LAN. Wireless links may also be implemented. In any such implementation, communication interface 118 sends and receives electrical, electromagnetic or optical signals that carry digital data streams representing various types of information.

Network link 120 typically provides data communication through one or more networks to other data devices. For example, network link 120 may provide a connection through local network 122 to a host computer 124 or to data equipment operated by an Internet Service Provider (ISP) 126. ISP 126 in turn provides data communication services through the world wide packet data communication network now commonly referred to as the "Internet" 128. Local network 122 and Internet 128 both use electrical, electromagnetic or optical signals that carry digital data streams. The signals through the various networks and the signals on network link 120 and through communication interface 118, which carry the digital data to and from computer system 100, are exemplary forms of carrier waves transporting the information.

Computer system 100 can send messages and receive data, including program code, through the network(s), network link 120 and communication interface 118. In the Internet example, a server 130 might transmit a requested code for an application program through Internet 128, ISP 126, local network 122 and communication interface 118. In accordance with the invention, one such downloaded application implements the techniques described herein.

The received code may be executed by processor 104 as it is received, and/or stored in storage device 110, or other non-volatile storage for later execution. In this manner, computer system 100 may obtain application code in the form of a carrier wave.

FUNCTIONAL OVERVIEW

In an embodiment of the invention, techniques are provided for performing array DML operations in a cost effective manner. For example, an application program APP1 may use a single array DML statement to insert an input series of data items into an array in the database. In response, a database server performs a "per-item" DML operation on each data item to be inserted into the array by executing a "per-item" DML statement for each data item. An example of an array DML statement, which is a statement that retrieves or manipulates data in arrays, is an "INSERT" SQL statement. The "INSERT" SQL statement may be used to insert data items into the array of data. The "per-item" operations used to manipulate data in arrays is collectively referred to herein as an "array DML" operation.

According to one embodiment, a technique for performing array DML operations in a cost effective manner involves the uninterrupted processing of the data items even after encountering error in the array DML operation. To illustrate, assume as before that the application program APP1 attempts to insert data items into an array. Further, assume that the application program APP1 passes input data from the user to the database server using input variables. The technique involves "binding" the data items (input data) to be passed to the database server. The process of binding data is described in greater detail below. In brief, a placeholder is used in a DML statement to mark the location within the statement at which input data is to be supplied in order to accomplish the data manipulation operation. The placeholder is associated with the address of the of the memory location of the input variable of the application program ("binding by reference").

Next, once the input series of data items is bound, a per-item data manipulation operation is performed on each data item of the input series of data items. If an error occurs during performance of a per-item DML operation, the array DML operation is not aborted. Instead, the array DML operation continues, and a per-item DML operation is performed on the next data item until all the items in the input series of data items have been operated upon. However, the error information is stored.

The error information may be later extracted and used to correct the errors that occurred during the first array DML operation. For example, a second array DML operation may be performed on the data items that were previously found to be erroneous during the execution of the first array DML operation. The process of extraction and use of the error information is described in greater detail below.

Figure 2:
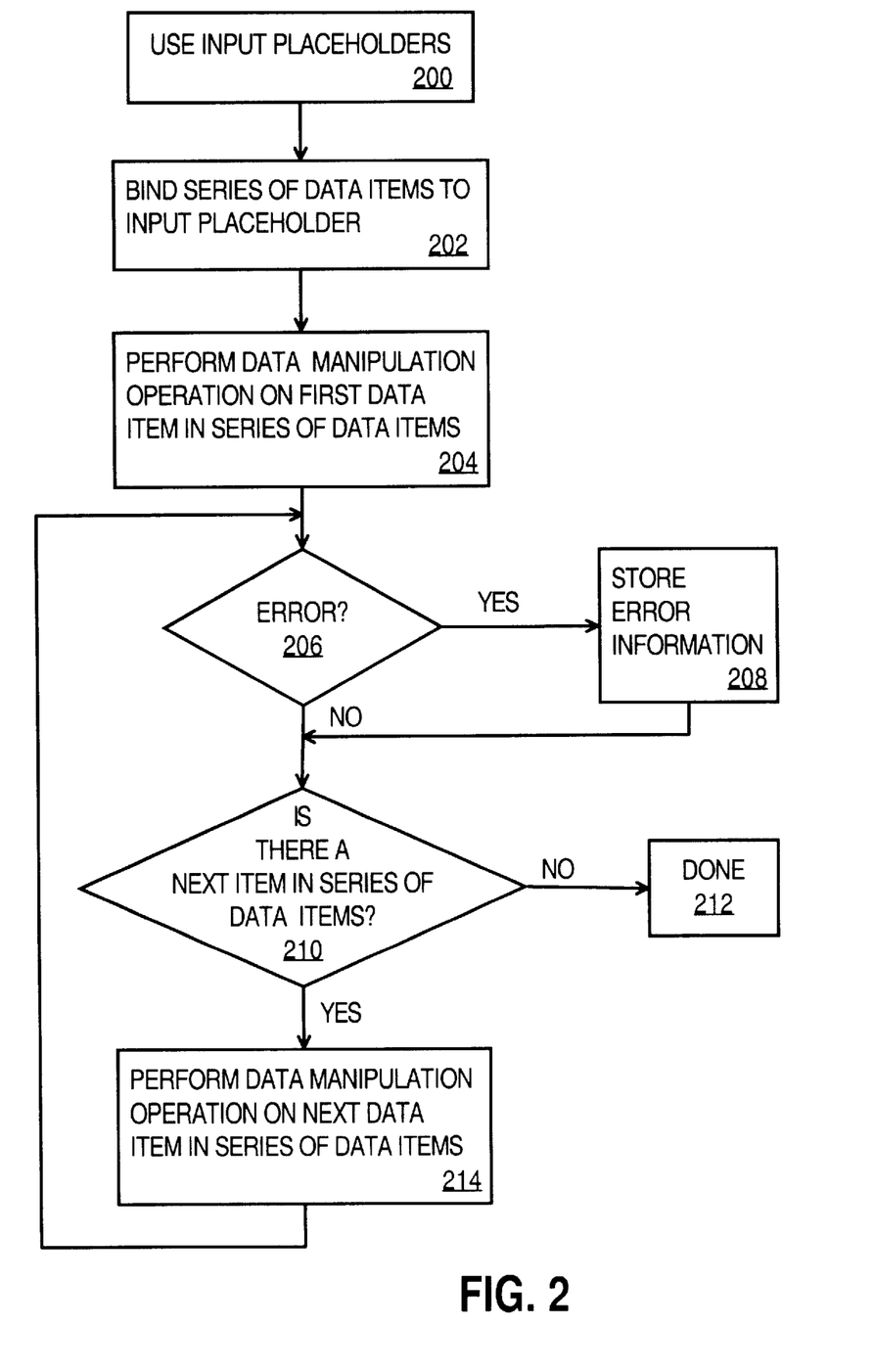
FIG. 2 is a flowchart illustrating steps for performing an array DML operation according to one embodiment of the invention.

FIG. 2 is a flowchart that illustrates steps for performing an array DML operation according to an embodiment of the invention. In block 200, input placeholders are used in an array DML statement to mark the location in the statement at which input data is to be supplied. Assume that a user of the application program supplies the input data. In one embodiment, placeholders can be used for input variables in any DML statement such as a DELETE, INSERT, SELECT or UPDATE statement. For example, assume that APP1 is programmed to insert into employee_stats values for employee name, salary amount and department number. Thus, the array DML statement:

INSERT INTO employee_stats (ename, sal, deptno)

VALUES (:ename, :sal, :deptno)

shows that employee_stats has three input variables, ename, sal, deptno. The VALUES clause establishes three corresponding placeholders, ":ename", ":sal", ":deptno", which indicate where input data is to be supplied by APP1.

Similarly, in the case of arrays, placeholders are used to mark the location within the DML statement at which values to an input array are to be supplied. For example, assume that APP1 is programmed to insert values into the two-dimensional array, "employee_stats" that consists of 1000 employee names and corresponding salary amounts. Assume that the input variable for employee names is a one-dimensional input array N[1000], and the input variable to the salary amount for the employees is a one-dimensional input array S[1000].

Thus, consider the example,

INSERT INTO employee_stats (N, S)

VALUES (:1, :2)

In (:1, :2), the ":1" is the placeholder for input array N[1000], and ":2" is the placeholder for input array S[1000].

In block 202, the input placeholder is bound by reference to the input series of data items. When a placeholder is bound to an input variable, an association is made between the placeholder and the address of the application program variable. The bound placeholder is known as a "bind variable" or simply a "bind". In one embodiment, during the bind phase, only the address, datatype and length of the variable need to be specified. Data does not have to be in the bind variable. In the statement:

INSERT INTO employee_stats (ename, sal, deptno)

VALUES (:ename, :sal, :deptno)

":ename" has the address "&ename", ":sal" has the address "&sal", and ":deptno" has the address "&deptno".

In the case where an array is bound to a placeholder, the process is known as an array bind. In the example, INSERT INTO employee_stats (N, S)

VALUES (:1, :2)

N[1000] is an array of a "string" datatype and has length 1000. S[1000] is an array of a "number" datatype and has length 1000. The placeholder ":1" is bound by reference to the address of the first data item in the array N, namely, "&N[1]", and the placeholder ":2" is bound by reference to address of the first data item in the array S, namely, "&S[1 ]". A sample code of the bind process can be found in Appendix A. Assume that array N[1000] consists of 1000 employee names, and the array S[1000] consists of employee salary data corresponding to the 1000 employee names in array N.

By binding by reference the placeholder ":1" to the address of the first data item in the input array N, the application program APP1 is in effect able to pass all the rows of input data for the input array N, as specified by the user, to the database server in one fell swoop. Input data for input array N can be hard coded into the application program APP1 or supplied as an input file when the user invokes the application program APP1. To illustrate, the database server performs a per-item DML operation on the first data item in input array N by executing a per-item DML statement on the first data item. Since the placeholder ":1" is bound by reference to the address of the first data item of the input array N, the database server automatically performs the per-item DML operation on the next data item in the input array N when the per-item DML statement is executed iteratively. The per-item DML operation is performed iteratively until all the data items from the input array N have been operated upon. Similarly, by binding by reference the placeholder ":2" to the address of the first data item in the array N, the application program APP1 is in effect able to pass all the input data for array S, as specified by the user, to the database server time in one fell swoop.

Returning to FIG. 2, in block 204, a per-item DML operation is performed on the first data item of the input series of data items, as in the case of an array. As an example, the per-item DML operation may be an INSERT operation as shown above.

To continue with the example above, in one embodiment, APP1 may be coded to allow the user to pass input array N and input array S at run time. For example, APP1 may be programmed to request the user to enter input data for input arrays N and S at the time when the per-item DML statement is first executed in APP1. Providing input data at run time is further described below in the section, "Dynamic Binding". In the case of Dynamic Binding, the application program is coded to call a subroutine that in turn requests for and accepts input data from the user. Thus, the input data is available for use by the application program APP1 before execution of the array DML statement in the application program.

In block 206, if during the performance of the array DML operation (for example, during an attempt to insert a value into a row of an array), a per-item DML error occurs, control is passed to block 208. At block 208, the error information is stored and control passes block 210. At block 210, it is determined if there is another data item in the input series of data items to be processed. If each data item of the input series of data items has been processed, then at block 212 the DML operation is completely done. Otherwise, at block 214, a per-item DML operation is performed on the next data item in the input series of data items. Control passes back to block 206 where the process continues until all the data items in the input series of data items have been operated upon.

ERROR INFORMATION

In one embodiment, the error information generated during an array DML operation (step 208), if any, is stored in an error heap. A heap is an area of storage for the allocation of data structures where the order of releasing the allocated data structure is indeterminate. Typically, the error information stored during the array DML operation includes diagnostic information that can be used to make corrections or changes to the data items that were operated upon during the first DML operation. Thus, the error information may include error messages and in the case of bind arrays, row_offsets that define the positions in a database array where errors have occurred.

Figure 3:
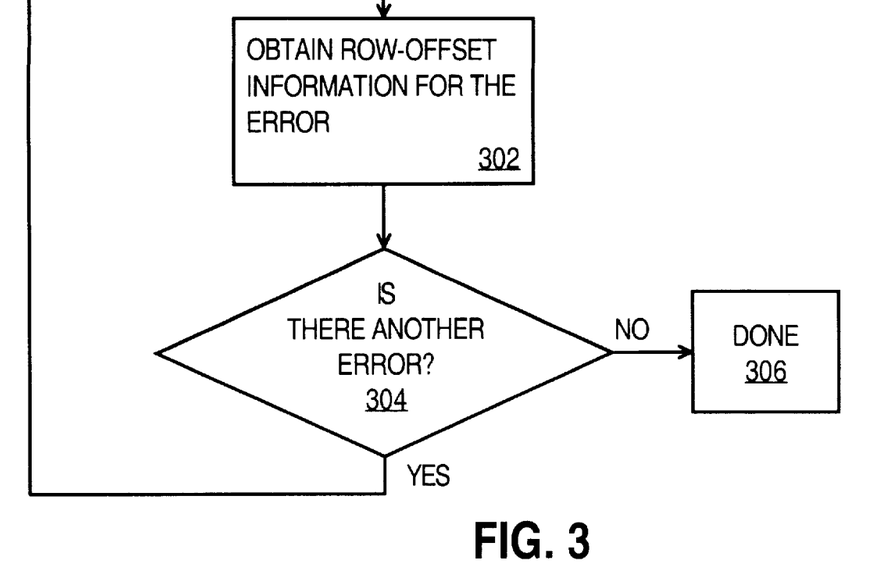
FIG. 3 is a flowchart illustrating a process for extracting error information from the error heap for use in making corrections or changes.

FIG. 3 is a flowchart that illustrates a process for extracting error information from the error heap for use in making corrections or changes to the data items for which errors were encountered during a previous array DML operation. In block 302, the row_offset of an error that was previously stored in the error heap is obtained. At block 304, it is determined if there is more error information stored in the in the error heap. If there is no more error information, then at block 306, the process of extraction is completely done. Otherwise, control is returned to block 302 where the process continues until the row_offset information for all the errors has been obtained. The error messages may be extracted in a similar fashion. A sample code for extracting error information is provided in Appendix A.

In the example above, based on the error messages, the user may choose to implement corrective action by supplying different data that the user believes to be appropriate by performing an UPDATE operation on the one or more positions of the relevant database array where errors have occurred. The positions in the database array where errors have occurred are identified by the row_offset information. The process of updating the values in the erroneous rows is described in further detail below in the context of dynamic binding.

DYNAMIC BINDING

In dynamic binding, input data for use in an array DML operation is usually not known a priori and hence is supplied only at run time.

Since the number of errors and the type of errors that will occur during an array DML operation are not known ahead of time, the user, prior to the performance of the array DML operation, is not able to supply substitute input data in response to the error information. Thus, substitute data can be supplied only after the conclusion of the execution of the array DML operation. For example, the application program, APP1 can be designed to provide to the user error information generated during an earlier performance of an array DML operation on an array. Based on the error information, the user may decide to perform a subsequent array DML operation, such as executing an UPDATE DML statement, on the array to modify the data items in the array for which errors were encountered during the earlier array DML operation by substituting different values for those data items. The substituted values for such data items are referred to herein as "update input data" or "modification input data".

Figure 4:
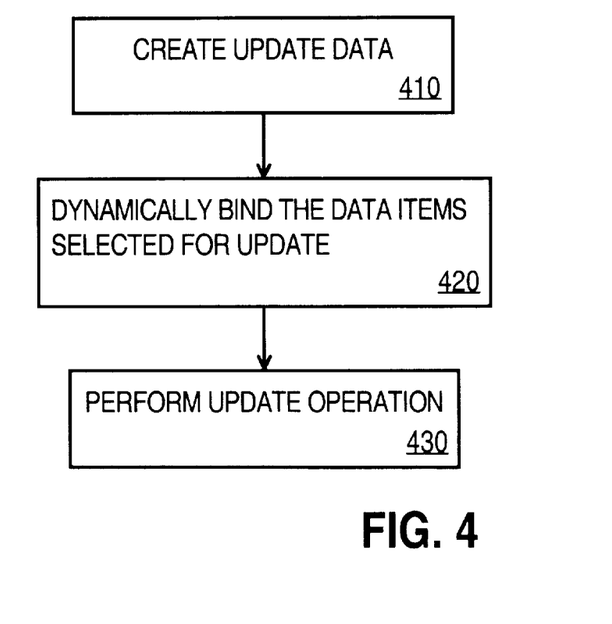
FIG. 4 is a flowchart diagram illustrating a process for performing a subsequent data manipulation operation, such as an UPDATE operation, after an initial operation encountered errors.

FIG. 4 is a flowchart that illustrates a process for performing a subsequent array DML operation, such as an UPDATE operation, to correct errors encountered in a previously executed array DML operation. In block 410, update input data is received by the application program from the user or the user causes the application program to receive the update input data. Continuing with the example above, assume that, based on the error information obtained from a previous array DML operation on employee_stats, the user decides to change the employee identification corresponding to the data item in the second row, first column of employee_stats. For example, assume that the existing value associated with the data item in the second row, first column of employee_stats is "Michael Smith". However, the error information indicates that "Michael Smith" is not a unique value with respect to employee_stats. The user may decide to substitute a unique value of "Michael P. Smith" for the data item in the second row, first column of employee_stats. Thus, "Michael P. Smith" is an example of update input data.

At block 420, the update input data is dynamically bound to the data items (rows in the array) that are selected for correction or modification based on the error information. For example, the row_offsets indicate which rows are selected. Dynamic binding involves using a user-defined function or subroutine ("callback") that can be programmed to pass the update input data during run-time. The "callback" obtains for the user memory buffers into which the user can write the update input data. For example, the application dynamically type in update input data into the memory buffers provided by "callback".

At block 430, the UPDATE DML operation is performed by executing the UPDATE DML statement, at which time update data is present in the memory buffers ready to be accessed during the UPDATE operation.

A sample code of dynamic binding is provided in Appendix A.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

APPENDIX A

Consider an application which inserts five rows (with two columns—NUMBER and CHAR) into a table. Furthermore, assume only two rows (rows 1 and 3) are successfully inserted in the DML operation. The user then proceeds to correct the data (wrong data was being inserted the first time) and issue an update with the corrected data. The user uses statement handles stmtp1 and stmtp2 to issue the INSERT and UPDATE respectively.

```
OCIBind *bindp1[2], *bindp2[2];
ub4 num_errs, row_off[MAXROWS], number[MAXROWS] = {1,2,3,4,5};
char grade[MAXROWS] = {'A', 'B', 'C', 'D', 'E'};
            /* Array bind all the positions */
OCIBindByPos (stmtp1,&bindp1[0],errhp,1,(dvoid*)&number[0],
     sizeof(number[0]),SQLT_NUM,(dvoid*)0,    (ub2*)0,(ub2*)0,
     0,(ub4*)0,OCI_DEFAULT);
OCIBindByPos(stmtp1,&bindp1[1],errhp,2,(dvoid*)&grade[0],
     sizeof(grade[0],SQLT_CHR,(dvoid*)0,        (ub2*)0,(ub2
*)0,0,
        (ub4*)0,OCI_DEFAULT);
                    /* execute the array INSERT */
OCIStmtExecute (svchp,stmtp1,errhp,5,0,0,0,OCI_BATCH_ERRORS);
                    /* get the number of errors */
OCIAttrGet(stmtp,OCI_HTYPE_STMT,&num_errs,0,
                OCI_ATTR_NUM_DML_ERRORS,errhp);
if(num_errs) {
    /* The user can do one of two things: 1) Allocate as many */
    /* error handles as number of errors and free all handles */
    /* at a later time; or 2)Allocate one err handle and reuse */
    /* the same handle for all the errors */
    OCIError *errhnd1[num_errs];
    for (i = 0; i <num_errs; i++) {
            OCIParamGet(errhp, OCI_HTYPE_ERROR, &errhnd1[i], i+1);
            OCIAttrGet(errhndl[i], OCI_HTYPE_ERROR, &row_off[i], 0,
                       OCI_ATTR_DML_ROW_OFFSET, errhp);
            OCIErrorGet(. . ., errhndl[i], . . .);
    }
}
/* get error diagnostics and make corrections to bind data */
OCIBindPyPos(stmtp2,&bindp2[0],errhp,1,(dvoid*)0,0,SQLT_NUM,
     (dvoid*)0,                    (ub2*)0,(ub2*)0,0,(ub4*)0,OCI_DATA_AT_EXEC);
OCIBindByPos(stmtp2,&bindp2[1],errhp,2,(dvoid*)0,0,SQLT_DAT,
     (dvoid*)0,                    (ub2*)0,(ub2*)0,0,(ub4*)0,OCI_DATA_AT_EXEC);
            /* register the callback for each bind handle */
OCIBindDynamic(bindp2[0],errhp,row_off[0],my_callback,0,0);
OCIBindDynamic(bindp2[1],errhp,row_off[1],my_callback,0,0);
                    /* execute the UPDATE statement */
OCIStmtExecute(svchp,stmtp2,errhp,2,0,0,0,OCI_BATCH_ERRORS);
``` program APP1 can be programmed to call the "callback" subroutine before an array DML statement in APP1 is executed by APP1. The "callback" is designed to allow the user to enter update input data. For example, the user may In this example, OCIBindDynamic is used because using a callback would be ideal as the user does not know a priori what rows would return with errors. With a callback, the user can simply pass in the erroneous row numbers (stored in row_off) through the callback context and send only those rows that need to be updated/corrected. The user can share the same bind buffers between the INSERT and the UPDATE executes.

What is claimed is:

1. A method for performing a first operation on an input series of data items, the method comprising the steps of:

(A) selecting a current data item in the input series of data items;

(B) performing the first operation on the current data item;

(C) if the first operation causes an error, then
storing an error information identifying the current data item;
establishing a next data item in the input series of data items as the current data item; and
repeating steps (B), (C) and (D) for the current data item;

(D) if the first operation does not cause an error, then
establishing a next data item in the input series of data items as the current data item; and
repeating steps (B), (C) and (D) for the current data item; and (E) repeating steps (B), (C) and (D) until the first operation has been performed on each data item of the input series of data items.

2. The method of claim 1 further comprising:
parsing once a statement that describes the first operation; and
dynamically providing input values associated with each data item of the input series of data items before execution of the operation.

3. The method of claim 2 wherein dynamically providing input values associated with the data items in the input series of data items during execution of the operation further comprises the steps of:
defining a callback for obtaining a memory buffer;
writing input values associated with each data item of the input series of data items into the memory buffer.

4. The method of claim 1 further comprising using the error information to perform a second operation that operates on data items selected based on the contents of the error information.

5. The method of claim 4 wherein the error information includes a series of error messages, a series of error numbers, and a series of error offsets.

6. The method of claim 4 further comprising the steps of:
providing update input values to perform the second operation on the data items selected based on the contents of the error information;
obtaining a series of offsets;
using the series of offsets to dynamically input the update input values for performing the second operation on the data items selected based on the contents of the error information;
defining a callback for obtaining a memory buffer; and
writing the update input values associated with each data item of the input series of data items into the memory buffer.

7. A computer-readable medium carrying one or more sequences of one or more instructions for performing a first operation on an input series of data items, the one or more sequences of one or more instructions including instructions which, when executed by one or more processors, cause the one or more processors to perform the steps of:

(A) selecting a current data item in the input series of data items;

(B) performing the first operation on the current data item;

(C) if the first operation causes an error, then
storing an error information identifying the current data item;
establishing a next data item in the input series of data items as the current data item; and
repeating steps (B), (C) and (D) for the current data item;

(D) if the first operation does not cause an error, then
establishing a next data item in the input series of data items as the current data item; and
repeating steps (B), (C) and (D) for the current data item; and (E) repeating steps (B), (C) and (D) until the first operation has been performed on each data item of the input series of data items.

8. The computer-readable medium of claim 7 further comprising:
parsing once a statement that describes the first operation; and
dynamically providing input values associated with each data item of the input series of data items before execution of the operation.

9. The computer-readable medium of claim 8 wherein dynamically providing input values associated with the data items in the input series of data items during execution of the operation further comprises the steps of:
defining a callback for obtaining a memory buffer;
writing input values associated with each data item of the input series of data items into the memory buffer.

10. The computer-readable medium of claim 7 further comprising using the error information to perform a second operation that operates on data items selected based on the contents of the error information.

11. The computer-readable medium claim 10 wherein the error information includes a series of error messages, a series of error numbers, and a series of error offsets.

12. The computer-readable medium of claim 10 further comprising the steps of:
providing update input values to perform the second operation on the data items selected based on the contents of the error information;
obtaining a series of offsets;
using the series of offsets to dynamically input the update input values for performing the second operation on the data items selected based on the contents of the error information;
defining a callback for obtaining a memory buffer; and
writing the update input values associated with each data item of the input series of data items into the memory buffer.

* * * * *

UNITED STATES PATENT AND TRADEMARK OFFICE
CERTIFICATE OF CORRECTION

PATENT NO.   : 6,493,710 B1
DATED        : December 10, 2002
INVENTOR(S)  : Gollapudi et al.

It is certified that error appears in the above-identified patent and that said Letters Patent is hereby corrected as shown below:

<u>Column 11,</u>
Lines 16-17, replace "repeating steps (B), (C) and (D) for the current data item;" with -- returning to step (B); --.
Lines 21-22, replace "repeating steps (B), (C) and (D) for the current data item; and" with -- returning to step (B); and --.

Signed and Sealed this

Thirtieth Day of September, 2003

JAMES E. ROGAN
*Director of the United States Patent and Trademark Office*